United States Patent
Palaios et al.

(10) Patent No.: US 12,262,240 B2
(45) Date of Patent: Mar. 25, 2025

(54) METHODS FOR INTELLIGENT RESOURCE ALLOCATION BASED ON THROTTLING OF USER EQUIPMENT TRAFFIC AND RELATED APPARATUS

(71) Applicant: Telefonaktiebolaget LM Ericsson (publ), Stockholm (SE)

(72) Inventors: Alexandros Palaios, Moers (DE); Mazen Abdel Latif, Aachen (DE); Abdulrahman Alabbasi, Kista (SE); Ali El Essaili, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 17/791,476

(22) PCT Filed: Jan. 8, 2020

(86) PCT No.: PCT/EP2020/050255
§ 371 (c)(1),
(2) Date: Jul. 7, 2022

(87) PCT Pub. No.: WO2021/139881
PCT Pub. Date: Jul. 15, 2021

(65) Prior Publication Data
US 2023/0042545 A1 Feb. 9, 2023

(51) Int. Cl.
*H04W 28/02* (2009.01)
(52) U.S. Cl.
CPC ... *H04W 28/0247* (2013.01); *H04W 28/0268* (2013.01)

(58) Field of Classification Search
CPC ............ H04W 28/0247; H04W 28/0268
See application file for complete search history.

(56) References Cited

U.S. PATENT DOCUMENTS 8,787,159 B2 * 7/2014 Barclay ............... H04L 47/245
455/406
10,165,480 B1 * 12/2018 Killadi ............... H04W 12/06
(Continued)

FOREIGN PATENT DOCUMENTS

| EP | 3165036 B1 * | 12/2018 | ......... H04L 27/2601 |
| EP | 3419357 A1 | 12/2018 | |
| WO | WO 2013/106870 A1 | 7/2013 | |

OTHER PUBLICATIONS

International Search Report and Written Opinion of the International Searching Authority, PCT/EP2020/050255, mailed Aug. 24, 2020, 17 pages.
(Continued)

*Primary Examiner* — Habte Mered
(74) *Attorney, Agent, or Firm* — Sage Patent Group

(57) ABSTRACT

A method performed by a network node for a wireless telecommunications network performs operations including providing a resource allocation model that corresponds to a base station and that provides a recommendation regarding resource allocation for a user equipment, UE, that is in an operating zone of the base station during a limited resource condition of the base station. Operations may include identifying, based on the resource allocation model, a reduced priority zone in the operating zone of the base station that corresponds to the UE having a high risk of reduced service from the base station relative to other UEs in the operating range of the base station.

19 Claims, 12 Drawing Sheets

(56) References Cited

U.S. PATENT DOCUMENTS

| | | | | |
|---|---|---|---|---|
| 2014/0349695 | A1* | 11/2014 | Zetterberg | H04W 72/569 |
| | | | | 455/512 |
| 2016/0029164 | A1* | 1/2016 | Attar | H04W 4/021 |
| | | | | 455/456.3 |
| 2017/0041931 | A1* | 2/2017 | Feng | H04W 72/121 |
| 2017/0359833 | A1* | 12/2017 | Sacha | H04L 5/0037 |
| 2018/0279139 | A1 | 9/2018 | Serrano Garcia et al. | |
| 2019/0313287 | A1* | 10/2019 | Li | H04W 28/18 |
| 2022/0036270 | A1* | 2/2022 | Benyo | G06F 9/5027 |
| 2023/0007662 | A1* | 1/2023 | IJntema | H04L 45/64 |

OTHER PUBLICATIONS

Sofman, et al., "Improving Robot Navigation Through Self-Supervised Online Learning," Nov. 2006, Journal of Field Robotics 23 (11-12), pp. 1059-1075.

"Intelligent Transport Systems (ITS); Users and applications requirements; Part 2: Applications and facilities layer common data dictionary," ETSI TS 102 894-2 V1.2.1 (Sep. 2014) 94 pages.

* cited by examiner

METHODS FOR INTELLIGENT RESOURCE ALLOCATION BASED ON THROTTLING OF USER EQUIPMENT TRAFFIC AND RELATED APPARATUS

CROSS REFERENCE TO RELATED APPLICATIONS

This application is a 35 U.S.C. § 371 national stage application of PCT International Application No. PCT/EP2020/050255 filed on Jan. 8, 2020, the disclosure and content of which is incorporated by reference herein in its entirety.

TECHNICAL FIELD

The present disclosure relates generally to methods and apparatus for intelligence resource allocation at a network node a wireless telecommunications network.

BACKGROUND

Cells can become overloaded, in particular during peak hours. This leads to performance degradation and even service interruption to users. Systems under high utilization can equally split all the remaining resources between the user equipments, UEs. Reference is now made to FIG. 1, which is a schematic diagram illustrating a wireless telecommunication network node having a plurality of UEs and operating at a high utilization. For example, as illustrated, a network node 10, such as a highly utilized radio access node, RAN, may have a utilization of 90% or more. The currently connected users (UEs) may require much more service that, in aggregate, the network node 10 may be unable to serve. In such a case the network node may take the remaining 10% and attempt to split it equally. That means that all UEs will not get the service requested and instead only achieve a marginal improvement.

SUMMARY

According to some embodiments, a method performed by a network node for a wireless telecommunications network is provided. Such method may include providing a resource allocation model that corresponds to a base station and that provides a recommendation regarding resource allocation for a user equipment, UE, that is in an operating zone of the base station during a limited resource condition of the base station. Operations may include identifying, based on the resource allocation model, a reduced priority zone in the operating zone of the base station that corresponds to the UE having a high risk of reduced service from the base station relative to other UEs in the operating range of the base station. Embodiments herein may use machine learning techniques to generate, train and/or use the resource allocation model disclosed herein. Advantages of this approach include the capability to process multiple data types and/or dimensions thereof, each having different levels of importance, in a manner that purely mathematical approaches may not provide. In some embodiments, a computer program product is provided that includes a non-transitory computer readable storage medium having computer readable program code stored in the medium and when executed by at least one processor of a computer system for a telecommunications network causes the computer system to perform operations including providing a resource allocation model that corresponds to a base station and that provides a recommendation regarding resource allocation for a user equipment "UE" that is in an operating zone of the base station during a limited resource condition of the base station. Operations include identifying, based on the resource allocation model, a reduced priority zone in the operating zone of the base station that corresponds to the UE having a high risk of reduced service from the base station relative to other UEs in the operating range of the base station.

Some embodiments provide that a method of operating a user equipment "UE" in a wireless telecommunication system is provided. The method may include operations of sending a service request to a network node that is operating in a limited resource condition and receiving less than a requested service level based on a service priority of the UE and based on the network node determining that the UE is in a reduced priority zone based on data from a resource allocation model that corresponds to the network node.

Some embodiments provide that a user equipment, UE, is provided. The UE may include at least one processor and a memory. The memory contains instructions executable by the at least one processor to cause the UE to send a service request to a network node that is operating in a limited resource condition and receive less than a requested service level based on a service priority of the UE and based on the network node determining that the UE is in a reduced priority zone based on data from a resource allocation model that corresponds to the network node.

As will be discussed in more detail below, according to some embodiments, the service priority of a UE may be used to safeguard that UEs with high priority, such as those providing critical services including, among others, those related to public safety, may not be throttled.

According to some embodiments, the methods provided, singly or in any indicated combination, are computer implemented methods, meaning that the methods may be executed by a processor of a computer or computer system. The methods provide the exemplary technical effect of increasing connection reliability for critical traffic UEs by enabling improved UE throttling.

According to some embodiments, a computer program can be provided that includes instructions which, when executed on at least one processor, cause the at least one processor to carry out methods performed by the computer system.

According to some embodiments, a computer program product can be provided that includes a non-transitory computer readable medium storing instructions that, when executed on at least one processor, cause the at least one processor to carry out methods performed by the network node.

Other systems, computer program products, and methods according to embodiments will be or become apparent to one with skill in the art upon review of the following drawings and detailed description. It is intended that all such additional systems, computer program products, and methods be included within this description and protected by the accompanying claims.

The following explanation of potential problems is a present realization as part of the present disclosure and is not to be construed as previously known by others.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to some embodiments, circumstances may provide that a network node 10 is highly utilized and is suddenly requested to provide significantly more resources that are not available. In high load cases where the network node 10 is low on resources, the network node may select which UEs 20 may benefit from increased resource allocation. For example, it may be advantageous to treat different ones of the UEs 20 differently based on predictions regarding the individual UE's 20 expected continued presence in the operating zone corresponding to the network node 10. For example, brief reference is made to FIG. 2, which is a schematic diagram illustrating a wireless telecommunication network node having a plurality of UEs and operating at a high utilization according to some embodiments disclosed herein.

Figure 1:
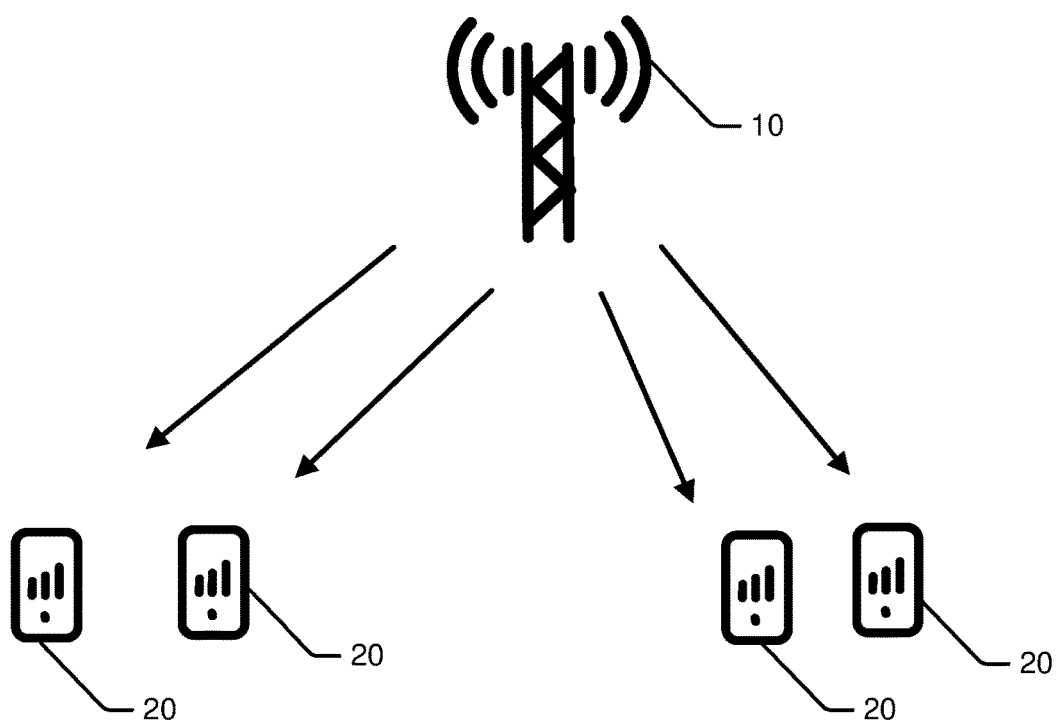
FIG. 1 is a schematic diagram illustrating a wireless telecommunication network node having a plurality of UEs and operating at a high utilization.
Figure 2:
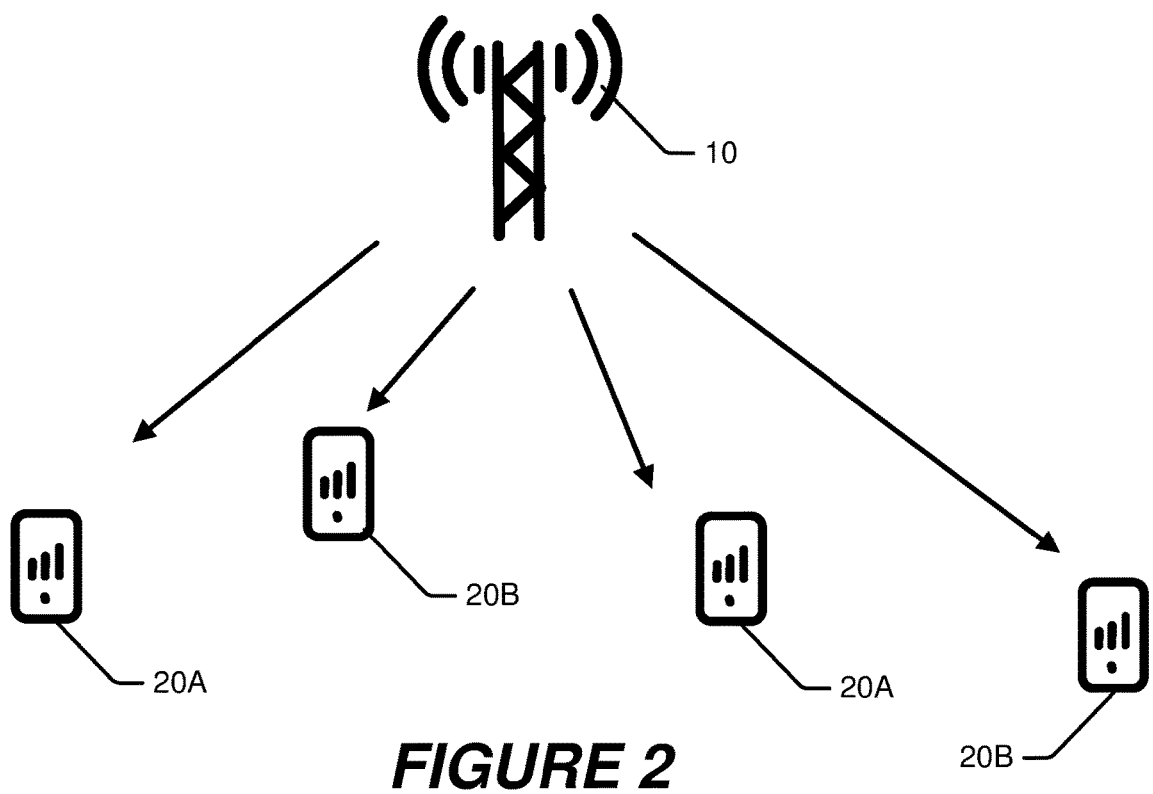
FIG. 2 is a schematic diagram illustrating a wireless telecommunication network node having a plurality of UEs and operating at a high utilization according to some embodiments disclosed herein.

Referring to FIG. 2, some UEs 20B may be marked as being predicted to move out of the operating zone of the network node 10 and/or to move to areas where the reference signal received power, RSRP, is poor. The network node 10 can, under high utilization scenarios, use its remaining resources for other UEs 20A that can use any extra allocated resources.

Some embodiments herein provide predictions regarding which UEs 20 will be in zones of the network node 10 in which the requested resources from the UEs 20 can be used.

According to some embodiments, a reduced priority zone may be defined for each UE 20 that allows the mobile network (specifically the network node 10) to classify some of the UEs 20B as having a higher risk of losing signal and/or receiving very low-quality service. The classification further allows the network node 10 to save resources, under very high-load scenarios. For example, system resources may be throttled from UEs that are in and/or are expected to be in a reduced priority zone and/or are potentially moving out of the operating zone of the network node 10. Reduced priority zones may also include zones that the radio conditions do not allow sustaining the requested service. In this manner, UEs 20 may receive best-effort type of traffic and/or any other type of traffic in which throttling is acceptable. According to some embodiments, methods herein may be adjusted to include different types of throttling for different categories of service. For example, any one or more service parameters may be adjusted to accomplish throttling based on the category of service.

According to some embodiments, the throttling of UEs 20B having higher risk of losing signal may be dependent on a service priority of a respective UE 20. According to embodiments UEs 20 having a high and/or temporarily elevated service priority may not be throttled even if being classified as having higher risk of losing signal, i.e. being classified as UEs of a reduced priority zone. UEs 20 having a high service priority may e.g. be UEs 20 flagged as used by public safety functions such as, for example, emergency medical services or various rescue services. According to some embodiments, the level of service priority may be set to be, for example, 1 or 0. The level of service priority of 1 may indicate high and/or elevated service priority such that a UE 20 with the level of service priority of 1 may not be throttled. In contrast, a level of service priority of 0 may indicate that the level of service priority is not-elevated such that a UE 20 with a level of service priority of 0 may be throttled if being classified as having higher risk of losing signal. According to further embodiments the level of service priority may be set as a quantitative value, wherein a quantitative value above a certain predefined priority threshold value is considered to indicate a high service priority and vice versa. UEs 20 may also be ranked according to such quantitative service priority value, wherein such ranking may be used to determine in what order throttling of UEs 20 should be performed.

In some embodiments, the reduced priority zone models may share some uncertainty where the signal may quickly drop to unacceptable levels. Such uncertainty may be captured from the size of the reduced priority zone. In some embodiments, the reduced priority zone size may depend on several parameters including dynamic changes to the reduced priority zone, which may be referred to as cell breathing (if present), the movement of the UE 20, the sampling speed of the UE 20 and/or the direction of movement of the UE 20.

Machine learning may be used to proactively learn and update the reduced priority zone(s) per UE 20 in real time.

Some embodiments provide that advantages of the concepts herein include that the network node 10 can learn, for very high utilization levels, to give priorities for any new resource allocation, to UEs 20 that have higher chance of receiving the packet. This may be a feature at the network node 10 that may be enabled and/or disabled as needed. In this manner, for network nodes 10 under high utilization conditions having UEs 20 with the same priority, the remaining few resources may be devoted to the UEs 20 that can actually benefit from the resource allocation.

Figure 3:
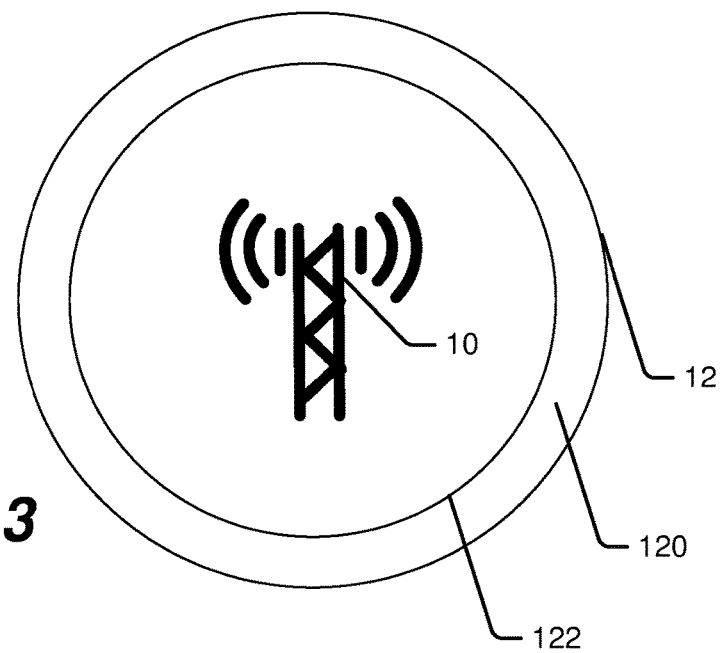
FIG. 3 is a schematic diagram illustrating a wireless telecommunication network node that includes a reduced priority defined for a given UE according to some embodiments disclosed herein.

Reference is now made to FIG. 3, which is a schematic diagram illustrating a wireless telecommunication network node that includes a reduced priority zone defined for a given UE according to some embodiments disclosed herein. Some embodiments provide that the network node 10 covers an operating zone 12, which may be referred to as the cell corresponding to that network node 10. Within the operating zone 12, embodiments herein may define a reduced priority zone 120. In some embodiments, the reduced priority zone 120 may be proximate and/or adjacent an outer boundary of the operating zone 12, however, such embodiments are non-limiting. Some embodiments provide full service zones 122 that are not part of the reduced priority zone 120. Some embodiments provide that the network node 10 is configured to generate a reduced priority zone 120 for each of the plurality of UEs in the operating zone 12. The reduced priority zone 120 corresponds to an area of the operating zone 12 where the signal quality might drop and could soon result in the loss of connection.

Although illustrated as being close to a border of the operating zone 12, the reduced priority zone 120 may include, for example, areas that are close to a base station and/or that are not adjacent the border of the operating zone 12. For example, the reduced priority zone 120 may be any area in the operating zone 12 in which the radio conditions do not allow sustaining the requested resources. While the operating zone 12 and reduced priority zone 120 are illustrated as being generally circular, such illustrations are schematic and thus are non-limiting as the zone shapes may be substantially non-circular in shape. Some embodiments provide that the closeness to an operating zone 12 border may be calculated for each UE using one or more machine learning approaches for the network node 10. Defining the reduced priority zone 120 may optionally rely on geographical distance among other parameters.

Figure 4:
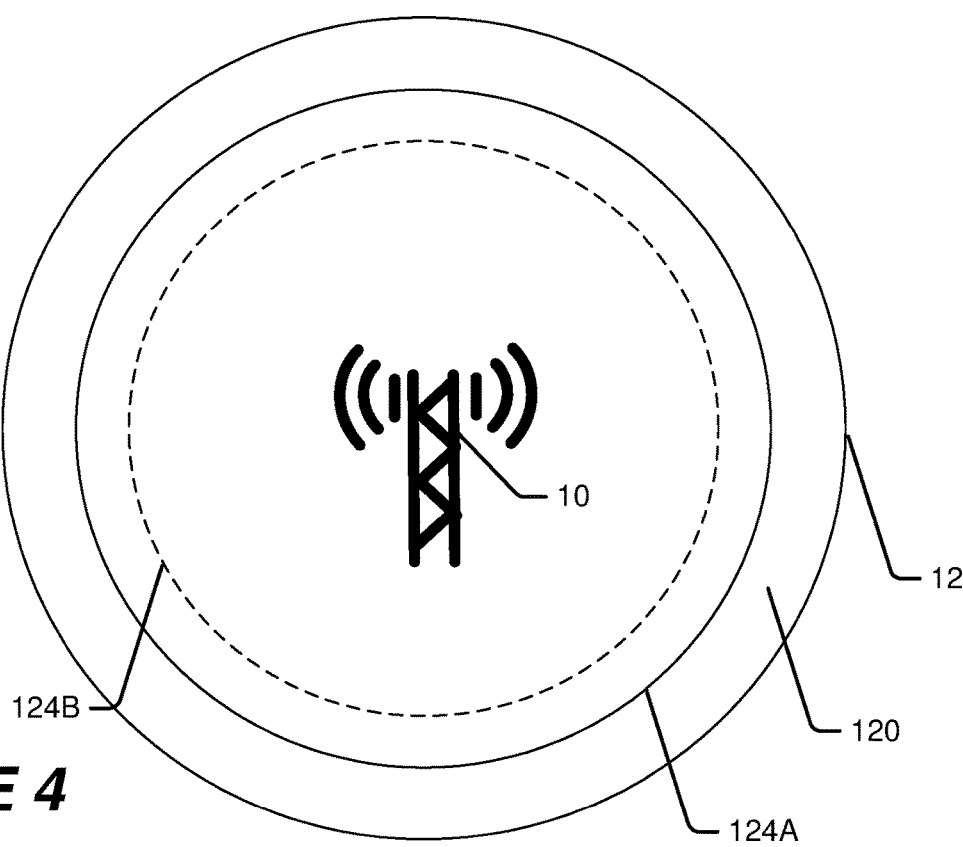
FIG. 4 is a schematic diagram illustrating a wireless telecommunication network node that includes a dynamic reduced priority zone defined for a given UE according to some embodiments disclosed herein.

Reference is now made to FIG. 4, which is a schematic diagram illustrating a wireless telecommunication network node that includes a dynamic reduced priority zone defined for a given UE according to some embodiments disclosed herein. In some embodiments, the reduced priority zone 120 may be dynamic in that the boundary between the operating zone 12 and the reduced priority zone 120 may change over time as the conditions change. For example, a first boundary 124A may be defined at a first time and, response to changing conditions, the reduced priority zone 120 may be defined by a second boundary 124B that is based on the new conditions. Examples of changing conditions include circumstances in which the size of the operating zone 12 change, among others.

Some embodiments provide that the reduced priority zone 120 may be in areas of the operating zone 12 that are not adjacent the operating zone 12 border. In some embodiments, the reduced priority zone 120 may be defined by multiple parameters that may include achieved rates, RRC status (connected-disconnected), RSRP values and/or a combination thereof. Additional parameters may include latency and/or reliability of connections. For example, if in some regions the achieved rates are very low then the UE can be considered to be in a reduced priority zone and susceptible to losing the connection. Similar analysis applies to RSRP as well as other metrics that can characterize the quality of the connection such as RSRQ or RSSI.

Figure 5:
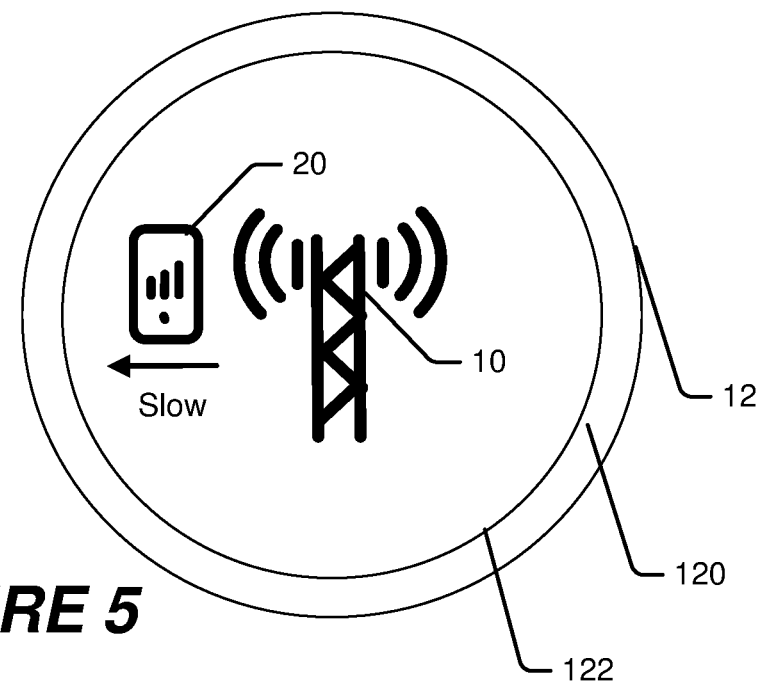
FIG. 5 is a schematic diagram illustrating a wireless telecommunication network node that includes a reduced priority zone defined for a given UE according to some embodiments disclosed herein.

Reference is now made to FIG. 5, which is a schematic diagram illustrating a wireless telecommunication network node that includes a reduced priority zone defined for a given UE according to some embodiments disclosed herein. In some embodiments, the reduced priority zone 120 may depend on the speed and/or direction of the UE 20. For example, if the UE 20 is moving towards the reduced priority zone 120 at a relatively slow speed then the reduced priority zone 120 may be defined as being further from the UE 20 and/or smaller relative to a reduced priority zone 120 in other circumstances. Further, some embodiments provide that the reduced priority zone 120 size can also depend on the environment, i.e., building types and/or weather, among others.

Figure 6:
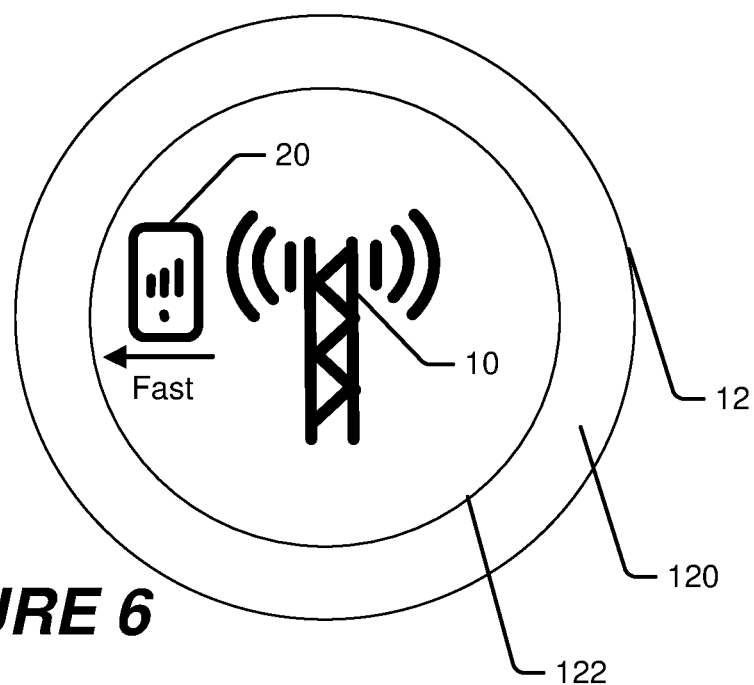
FIG. 6 is a schematic diagram illustrating a wireless telecommunication network node that includes a reduced priority zone defined for a given UE according to some embodiments disclosed herein.

Some embodiments provide that the reduced priority zone 120 may expand to capture the larger uncertainty that UE will be soon out of the coverage of the cell. Reference is now made to FIG. 6, which is a schematic diagram illustrating a wireless telecommunication network node that includes a reduced priority zone defined for a given UE according to some embodiments disclosed herein. The UE 20 is illustrated as moving at a fast speed relative to that of FIG. 5 discussed above. As such, the reduced priority zone 120 is increased to correspond to the increased likelihood that the UE 20 will be moving out of the operating zone at the same relative time period. The sampling speed of the UE 20 may also be important and may be considered as a parameter. For example, very slow measurement/reporting frequencies from the UE 20 may make the reduced priority zones 120 increase in size.

In some embodiments, the network node 10 that is under high load and limited resources can throttle the resources to the UEs 20 that are being characterized to be inside the reduced priority zone 120. In some embodiments, a scheduler can decide to maintain just a basic service to the reduced priority zone 120 UEs 20 as a way to protect resources for the remaining UEs that can use any remaining resources more efficiently. When resources become available again the scheduler can try to restore resources for the reduced priority zone 120 UEs 20. As disclosed herein, the terms network and RAN may be used interchangeably. Methods herein may be performed in the network that controls the RANs and/or at each RAN independently.

In some embodiments, the network node 10 throttles only UEs 20 with best effort traffic, whereas UEs 20 with URLLC (ultra-reliable low latency) and/or critical traffic may not be throttled.

In some embodiments, the network node 10 may throttles only UEs 20 with best effort traffic. Best effort may include traffic that does not have relevantly strict E2E latency requirement on delivery. Some embodiments provide that the term 'relevantly strict E2E latency' means that latency requirement is stricter than the time required for the UE 20 to handover to a neighboring cell. For instance, UEs 20 with URLLC (ultra-reliable low latency) or AR/VR traffic may not be throttled.

In some embodiments, the network node 10 may dynamically change the width of the gray zone as a function of theta, which may represent different sectors, such as angularly defined sectors, of a generally circular reduced priority zone 120. For example, in contrast with sectors being defined by a general distance from a center point, angularly defined sectors may be specifically defined by angular values that define the sectors. For example, a sector defined by a theta of 0 to 90 degrees may define a top right quarter of a region and/or portion thereof. Similarly, a sector defined by a theta of 0 to 180 degrees may define the right half of the region and/or portion thereof. Some embodiments provide that a sector may be defined by a center point, a radial extending from the center point and an angular range.

In some embodiments, an intelligent agent, such as a machine learning (ML) agent, may receive a plurality of parameters as inputs and produce output that classifies each of the UEs 20 being in a reduced priority zone 120 or not. For example, in some embodiments, the output from the ML agent may include a binary value corresponding to each UE 20 that identifies whether the UE 20 is in a reduced priority zone 120.

In some embodiments, the output of the ML agent may include a probability value that estimates the cumulative distribution function, CDF, threshold x of the probability of the UE 20 being in the reduced priority zone 120. In this manner, the inputs (speed, RSRQ/interference, etc.) to the machine learning agent can be modeled as a random variable with mean, variance, lower bound and/or upper bound, among others. Examples of inputs for an ML agent and corresponding sources thereof are be listed in Table 1 below:

TABLE 1

| Input to the Machine Learning | Source |
| --- | --- |
| Speed | It can be calculated by the UE (e.g. UE-GPS, Radio Location) |
| Direction | It can be calculated by the UE (e.g. UE-GPS, Radio Location) |
| Cell Breathing | gNB |
| RSRP of current and neighbor cells | UE |
| RSRQ of current and neighbor cells (interference) | UE |
| Reflection and environmental variable | gNB (based on the dynamics of the environment) |
| Load of current and neighbor cells | gNB (CU and DU) |
| Sampling rate of UE measurements | UE |

In some embodiments, the output of the ML agent may estimate the desired value (either integer or probability) for the next time slot. Next time slot can vary in msec, sec, and/or minutes, among others.

In some embodiments, the network node 10 may use the predicted number of UEs 20 within the reduced priority zone (or the associated probability) to dynamically allocate the fraction frequency reuse (FFR) layer. In this scheduling operation, the network node allocates different band-widths in neighbors' cells reduced priority zones. In this manner, the inner layers may have similar frequencies.

Regarding data collection that is related to the speed, direction and/or the location of the UE such information may be generated using an external global positioning system, GPS, device and/or using radio location data that may be generated and/or provided by the telecommunication network, such as 3GPP system. For example, RSRP values might be used to some extent to calculate speed position and/or direction. Some embodiments provide that such type of information may be collected from other relevant fields. For example, a recent ETSI document (ETSI TS 102 894-2 V1.2.1 (2014-09)) related to Intelligent Transport Systems (ITS), defines many fields that provide such type of information. Although not exhaustive, examples of values in such fields may include:

DE_HeadingValue: Orientation of a heading with regards to the WGS84 north.

DE_Longitude: Absolute geographical longitude in a WGS84 co-ordinate system, providing a range of 180 degrees to the east or to the west of the prime meridian.

A.45 DE_LongitudinalAccelerationValue: Vehicle acceleration at longitudinal direction in the centre of the mass of the empty vehicle.

DE_SpeedConfidence: The absolute accuracy of a speed value information for a predefined confidence level.

DE_SpeedValue: A speed value.

DE_VerticalAccelerationValue: Vehicle acceleration at vertical direction in the centre of the mass of the empty vehicle.

Figure 7:
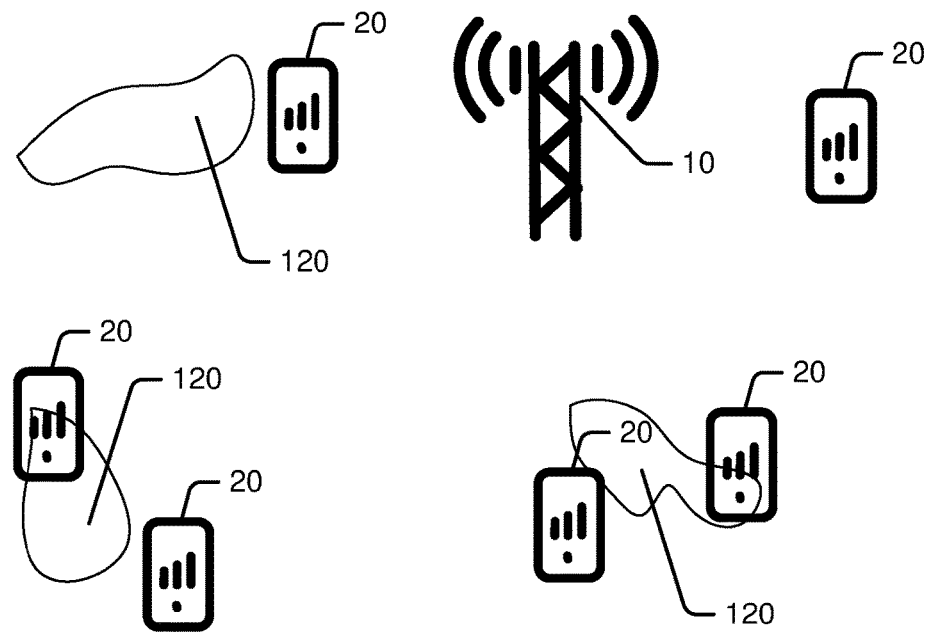
FIG. 7 is a schematic diagram illustrating a visualization of the connection between the labels and the position of a UE inside an operating zone according to some embodiments.

Some embodiments provide that classification may rely on a labeled data set identifying whether a given UE 20 is in a reduced priority zone 120. Such labeling may be performed before training a resource allocation model. Reference is now made to FIG. 7, which is a schematic diagram illustrating a visualization of the connection between the labels and the position of a UE 20 inside an operating zone according to some embodiments. Some embodiments provide that the system collects measurements over a period of a time X. The collection is used for training the resource allocation model. The time period X may depend on the density of the active UEs 20 and the area of deployment and may be set specifically for each network node and/or base station, BS. This period of time can be in the order of minutes, hours and days, with the last two being the most natural choices for most deployments, since the BS needs to have measurements from almost all paths in its cell.

Some embodiments provide that the collected measurements are split into blocks of smaller durations. These durations may be deployment specific and may depend on the size of the operating zone and the average speed of the UEs 20 in that zone. In some embodiments, the blocks are marked with a binary flag of zero or one. If during this block of measurements, the UE 20 has lost connection or the value has dropped to extremely low values, such that the connection is barely maintained, then the dataset may be marked as a reduced priority zone block, for example, by marking the block with a "1" value. If not, then the block is marked with "0" value.

Figure 8:
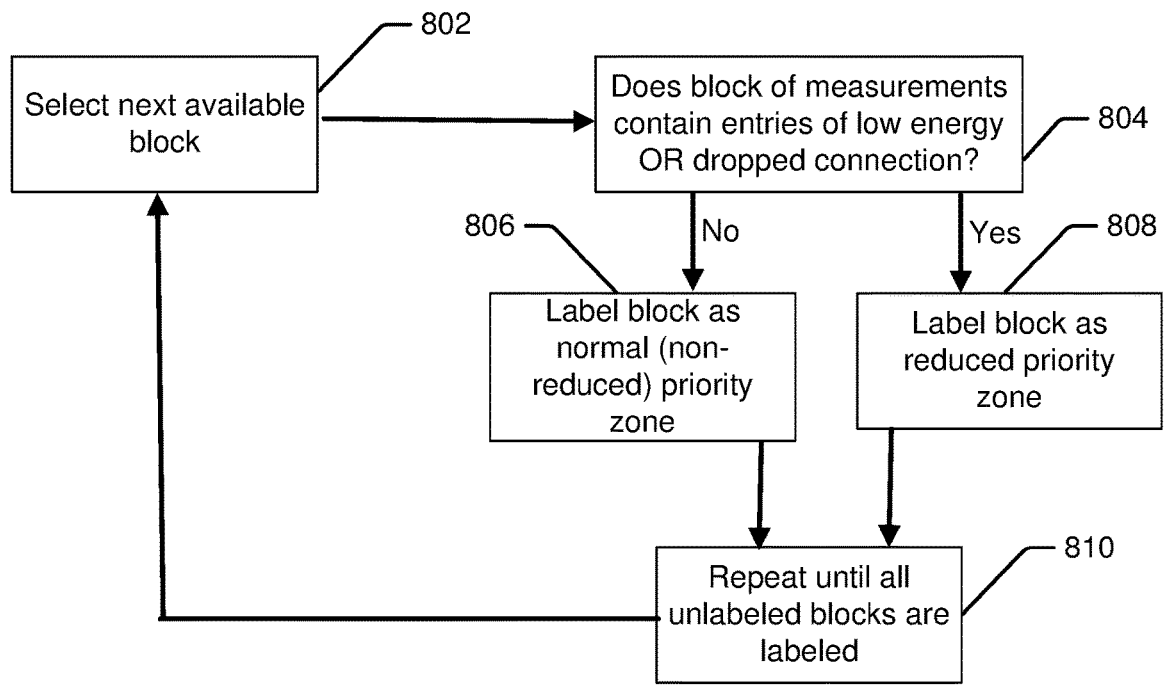
FIG. 8 is a schematic diagram illustrating automating the labeling process when all data are pre-collected according to some embodiments.

In some embodiments, the labeling process may be automated. For example, some embodiments provide that if all data are pre-collected for a long period of time, then the labeling process may be performed iteratively. For example, reference is now made to FIG. 8, which is a schematic diagram illustrating automating the labeling process when all data are pre-collected according to some embodiments. According to FIG. 8, operations begin with selecting the next available block of measurements (block 802). A determination is made regarding whether the block of measurements contains entries having a low energy or dropped connection (block 804). If the block of measurements contains an entry with low energy or a dropped connection, then the block is labeled as a reduced priority zone block (block 808). If the block of measurements does not contain an entry with low energy or a dropped connection, then the block is labeled as a normal (non-reduced) priority zone block (block 806). Operations repeat until all unlabeled blocks are labeled (block 810).

Figure 9:
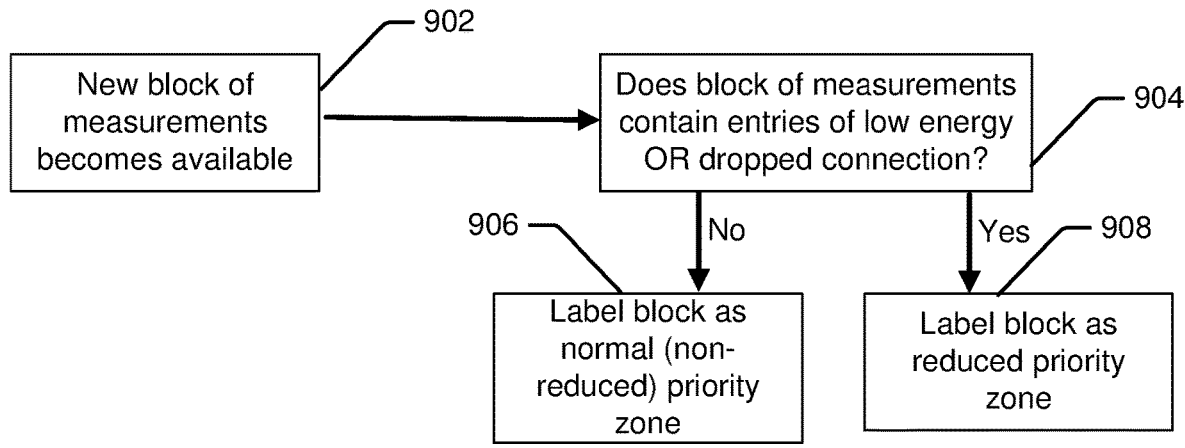
FIG. 9 is a schematic diagram illustrating automating the labeling process when data is not pre-collected according to some embodiments.

Some embodiments provide that the labeling process may be automated for cases in which the data is not pre-collected. For example, reference is now made to FIG. 9, which is a schematic diagram illustrating automating the labeling process when data is not pre-collected according to some embodiments. According to operations, a new block of measurements becomes available (block 902). A determination is made regarding whether the block of measurements contains entries having a low energy or dropped connection (block 904). If the block of measurements contains an entry with low energy or a dropped connection, then the block is labeled as a reduced priority zone block (block 908). If the block of measurements does not contain an entry with low energy or a dropped connection, then the block is labeled as a normal (non-reduced) priority zone block (block 906). Labeling operations begin again responsive to a new block of measurements becoming available (block 902).

Some embodiments provide that the resource allocation model may be trained in an offline training, online training and/or automated training. Offline training may calculate the reduced priority zones 120 per UE 20. Some embodiments provide that the network node 10 may first use some data for training at the initial phase. Such data may be collected and labeled as described herein. In some embodiments, the training may be executed based on the input parameters listed in Table 1 above. Machine learning may include techniques such as Neural Networks or Random Forests, among others. In some embodiments, the output of this learning is a resource allocation model that can classify if the UE is inside the reduced priority zone 120. In some embodiments, the resource allocation model may be trained in a base station and/or in a resource that is not part of the base station. For example, a central node may be used to train and then the trained resource allocation model may be received by the network node 10 from the central node or other resource.

Figure 10:
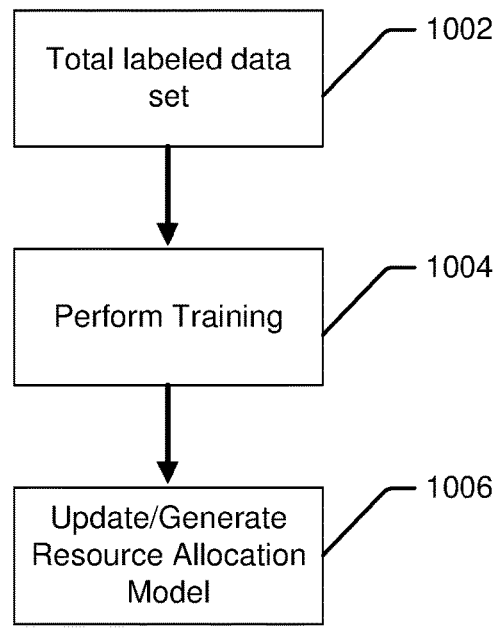
FIG. 10 is a schematic block diagram illustrating offline training on a labeled dataset according to some embodiments.

Reference is now made to FIG. 10, which is a schematic block diagram illustrating offline training on a labeled dataset according to some embodiments. The total labeled data set 1002 is used to perform the training of the resource allocation model offline by running the machine learning algorithm on the whole data set (block 1004). Based on the training, the resource allocation model is updated and/or generated (block 1006).

Figure 11:
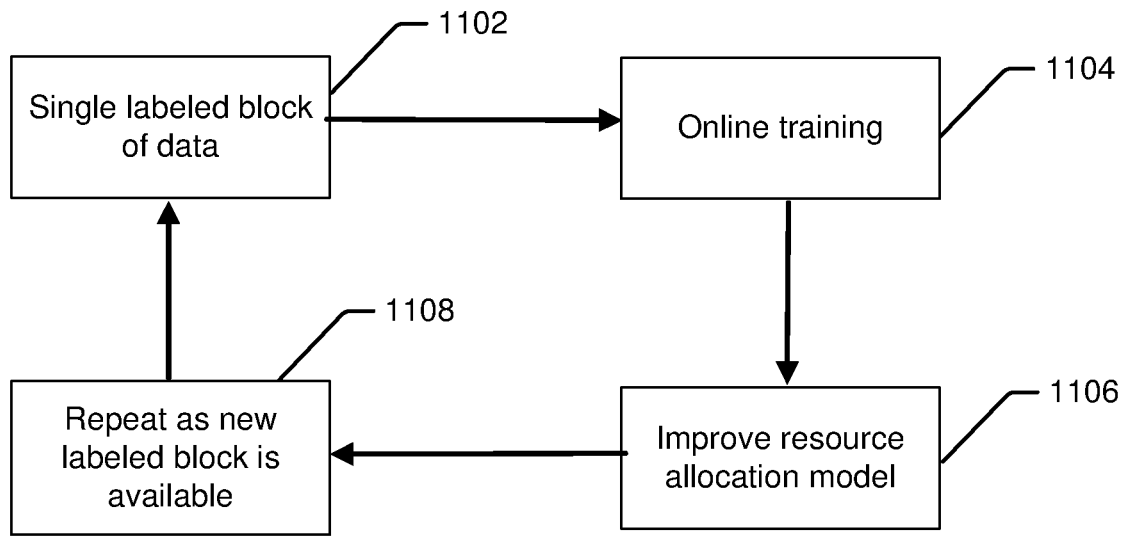
FIG. 11 is a schematic block diagram illustrating online training on labeled blocks according to some embodiments.

In some embodiments, online training may provide that the training occurs as labeled data becomes available. Reference is now made to FIG. 11, which is a schematic block diagram illustrating online training on labeled blocks according to some embodiments. Some embodiments provide that a single labeled block of data becomes available (block 1102). Online training is performed by applying the relevant machine learning algorithm to the single block of data (block 1104). As a result of the training, the resource allocation model is improved and/or updated (block 1106). The process repeats as new label blocks of data are received (block 1108).

In some embodiments, auto-regression models may be used to decide on reduced priority zones. For example, auto-regressive models (instead of classification models) may decide on the reduced priority zone 120 and throttle the UEs 20 that reside in that reduced priority zone 120. In some embodiments, a probability density function, PDF, of the reduced priority zone is predicted for each coordinate given some inputs, as describe above (instead of a 0 or 1 classifier). A cumulative density function, CDF, can be calculated from such PDF. Then, given the UE traffic criticality and the inputs to the resource allocation model, the network will set a threshold, which can be dynamically set depending on several parameters. As an example, a 50% threshold for all UEs 20 may treat them fairly. In some embodiments, the network operator may prioritize some set of UEs 20 by tuning the threshold. The obtained probability from the CDF may be compared to the calculated threshold and if it is larger than threshold the network will decide to throttle the UE 20. Otherwise the network may continue to support the UE 20.

In some embodiments, the resource allocation model may be retrained. For example, after a given time of running the model, new data may be used to improve the existing resource allocation model and/or generate a new resource allocation model.

Figure 12:
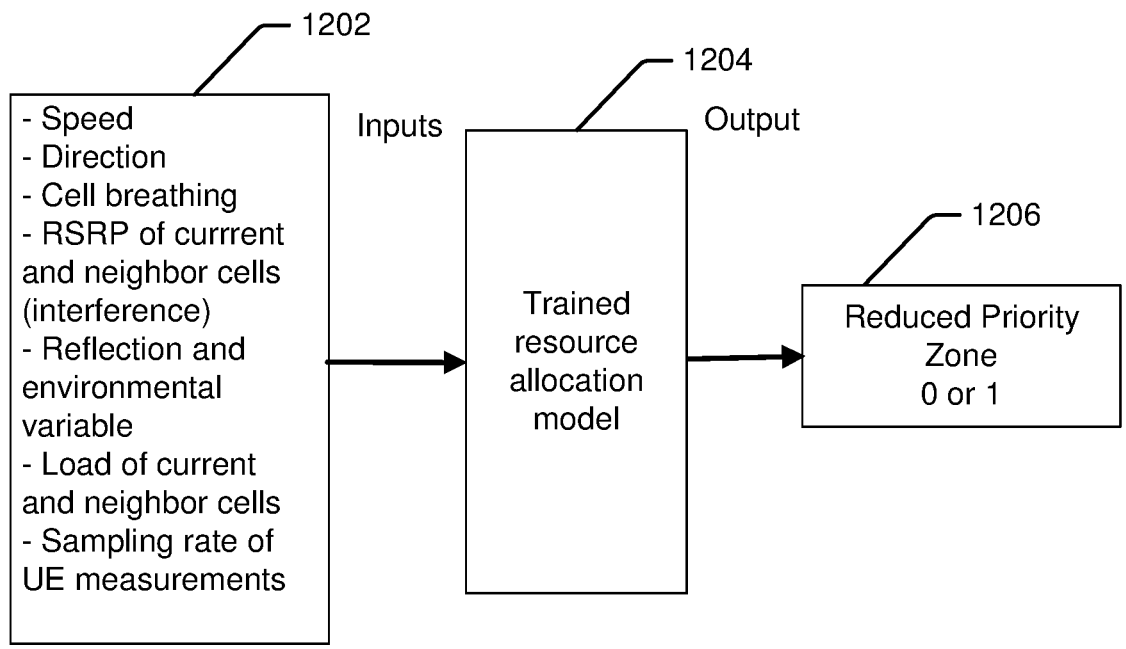
FIG. 12 is a schematic block diagram illustrating running the trained resource allocation model according to some embodiments herein.

Reference is nor made to FIG. 12, which is a schematic block diagram illustrating running the trained resource allocation model according to some embodiments herein. Some embodiments provide that the trained resource allocation model 1204 receives multiple different inputs 1202 and generates a binary value (0 or 1) for each of the active UEs 20. The binary value indicates whether the UE 20 is in a reduced priority zone or not.

Figure 13:
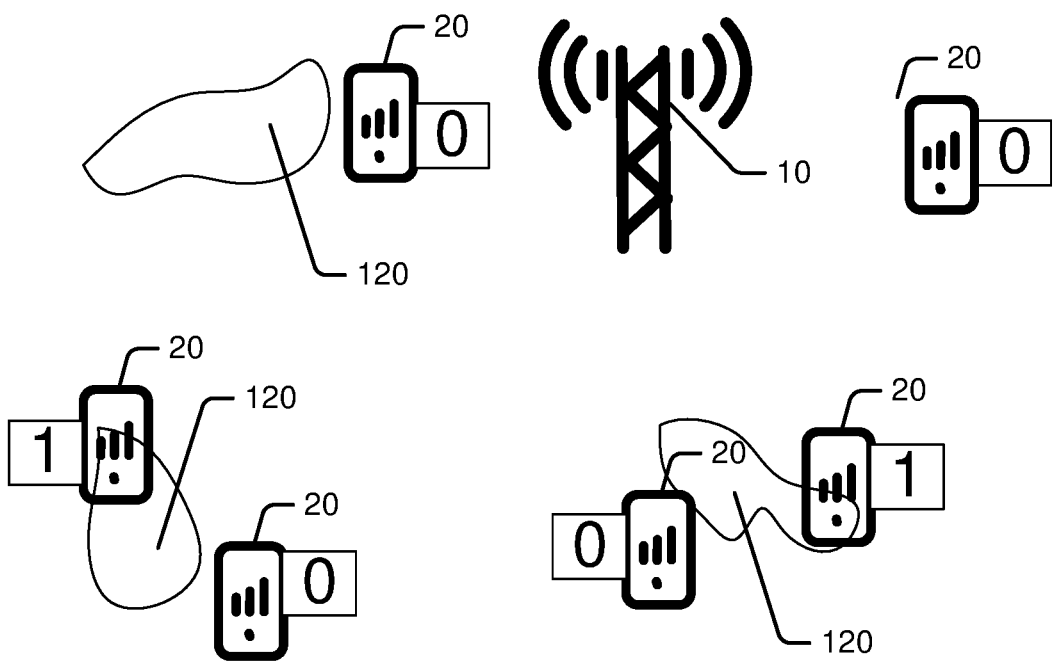
FIG. 13 is a schematic diagram illustrating a visualization of the UEs with corresponding binary values of "0" or "1" indicating whether the UEs are inside a reduced priority zone or outside a reduced priority zone according to some embodiments.

Brief reference is now made to FIG. 13, which is a schematic diagram illustrating a visualization of the UEs with corresponding binary values of "0" or "1" indicating whether the UEs are inside a reduced priority zone or outside a reduced priority zone according to some embodiments. During the running phase of the resource allocation model 1204, the active UEs 20 may be assigned a binary value ("1" or "0") that indicates whether that UE 20 is inside or outside a reduced priority zone 120. For example, based on the inputs received from each UE 20 the network node 10 may assign a label based on if the UE 20 is perceived to be inside or outside the reduced priority zone.

Figure 14:
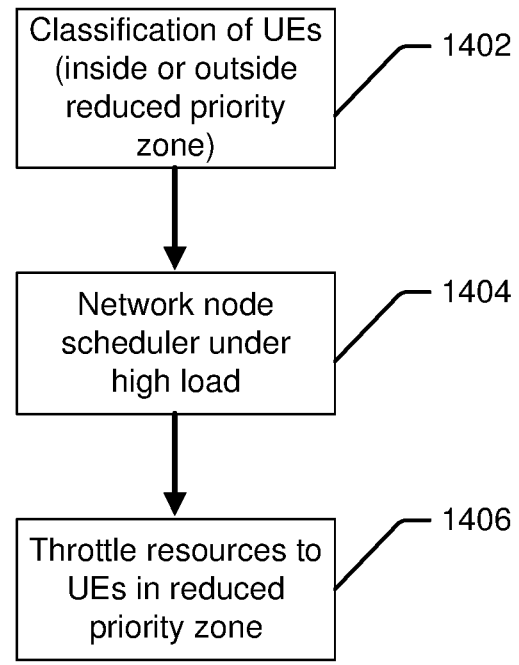
FIG. 14 is a schematic block diagram illustrating operations corresponding to a scheduler at a network node according to some embodiments.

Reference is now made to FIG. 14, which is a schematic block diagram illustrating operations corresponding to a scheduler at a network node according to some embodiments. In the case of very high resource utilization in which resources need to be saved, the network node 10 may decide to throttle resources to UEs 20 that are inside the reduced priority zones 120 where high resources requested from the UE 20 might be lost. This provides that the network node 10 can decide to throttle UEs 20 inside the reduced priority zones 120 and keep the resources for UEs that can make a good use of those. For example, operations include classification of the UEs 20 as being inside or outside a reduced priority zone (block 1402). The network node 10 may include a scheduler that is determined to be under a high load and/or utilization level (block 1404). Based on the high load and/or utilization level, the scheduler may throttle the resources to the UEs 20 that are being characterized to be inside the reduced priority zone 120 (block 1406). In some embodiments, the scheduler may determine to provide just a basic service level to the UEs 20 in the reduced priority zone 120 as a way to protect resources. Some embodiments provide that when resources become available again, the scheduler may try to restore resources for the reduced priority zone UEs 20.

According to embodiments herein, a network may be able to free up essential resource blocks (bandwidth) and help critical traffic UEs to enhance their reliability. For example, the network may learn to identify optimal reduced priority zones in which it will throttle the UEs with best-effort traffic and allocate such throttled resources to other UEs who have more critical traffic. Freeing up resource blocks may help critical traffic UEs to do more duplications and repetition of the signals and thus enhance reliability of the transmitted traffic. Some embodiments provide that an auto-regression model as described herein may enable the network to have more flexibility to decide and/or define the reduced priority zones and thus provide opportunities for more optimal throttling decisions to be made. Accordingly, increased opportunities to save more network resources and support critical UEs may be provided.

Figure 15:
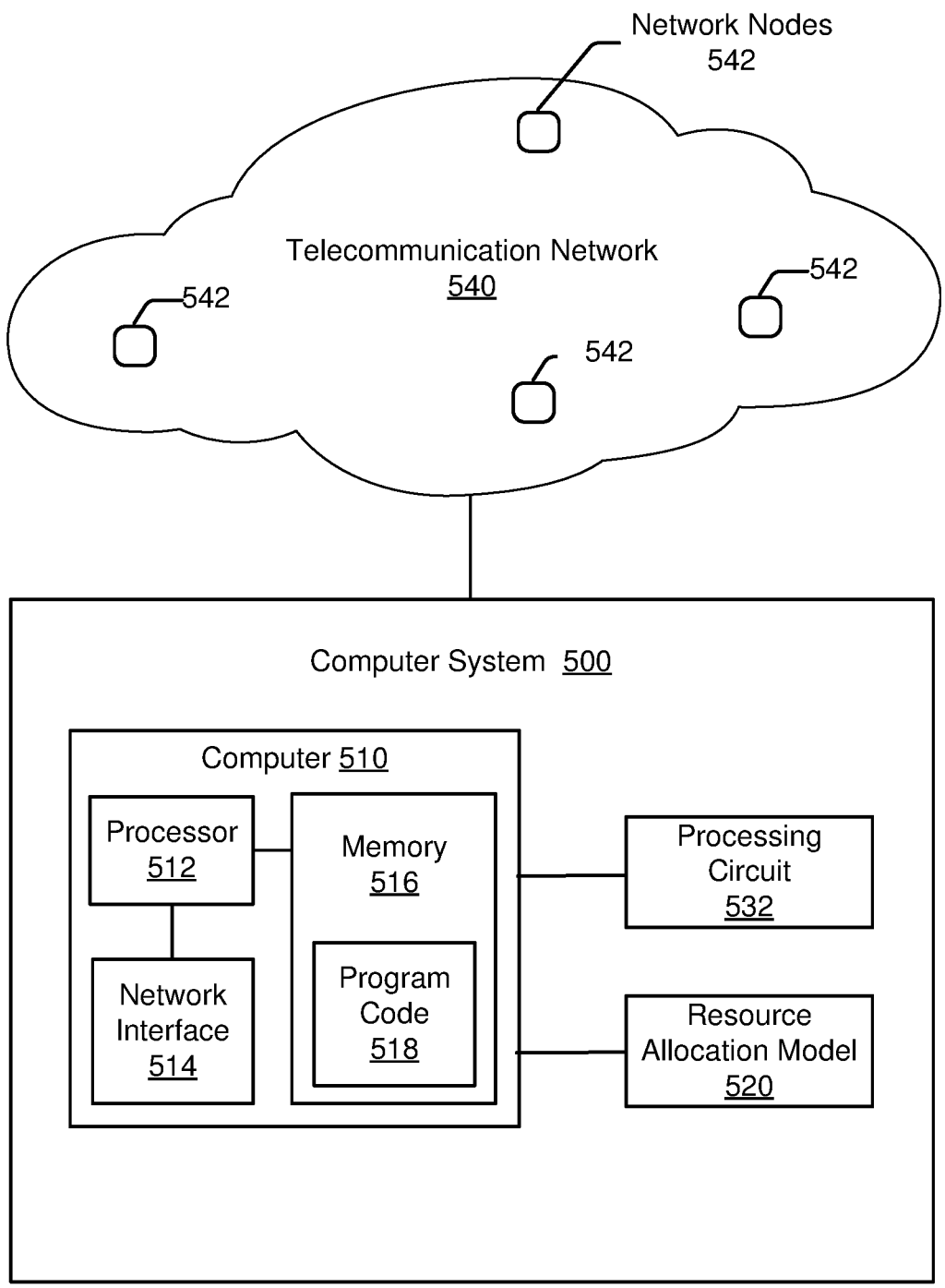
FIG. 15 is a schematic block diagram that illustrates a computer system according to some embodiments.

Reference is now made to FIG. 15, which is a schematic block diagram that illustrates a computer system according to some embodiments. The computer system 500 includes the resource allocation model 520, a processing circuit 532, and a computer 510. The computer 510 includes at least one memory 516 ("memory") storing program code 518, a network interface 514, and at least one processor 512 ("processor") that executes the program code 518 to perform operations described herein. The computer 510 is coupled to the resource allocation model 520 and the processing circuit 532. The computer system 500 can be communicatively connected to a telecommunications network 540 that includes a plurality of network nodes 542 that receive and forward communication packets being communicated through the network. More particularly, the processor 512 can be connected via the network interface 514 to communicate with the network nodes 542.

The processor 512 may include one or more data processing circuits, such as a general purpose and/or special purpose processor (e.g., microprocessor and/or digital signal processor) that may be collocated or distributed across one or more networks. The processor 512 may include one or more instruction processor cores. The processor 512 is configured to execute computer program code 518 in the memory 516, described below as a non-transitory computer readable medium, to perform at least some of the operations described herein as being performed by any one or more elements of the computer system 500.

Computer system 500 may be a cloud-based machine learning execution environment computer system or a cloud-based computing system communicatively coupled to the telecommunications network.

As used herein, network node refers to equipment capable, configured, arranged and/or operable to communicate directly or indirectly with a user device and/or with other network nodes or equipment in the radio communication network to enable and/or provide wireless access to the user device and/or to perform other functions (e.g., administration) in the radio communication network. Examples of network nodes include, but are not limited to, access points (APs) (e.g., radio access points), base stations (BSs) (e.g., radio base stations, Node Bs, evolved Node Bs (eNBs), gNode Bs (including, e.g., network node 542, etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a user device with access to the telecommunications network or to provide some service to a user device that has accessed the telecommunications network.

Figure 16:
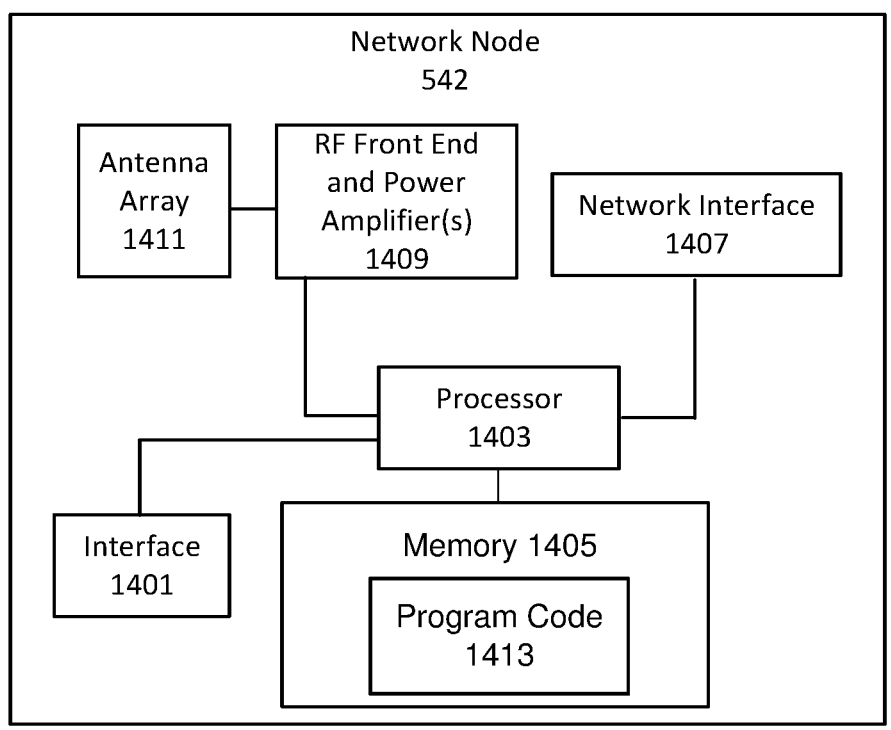
FIG. 16 is a block diagram illustrating a network node according to some embodiments of inventive concepts.

Reference is now made to FIG. 16, which is a block diagram illustrating a network node according to some embodiments of inventive concepts. Network node 542 may be implemented using structure of FIG. 16 with instructions stored in device readable medium (also referred to as memory) 1405 of network node 542 so that when instructions of memory 1405 of network node 542 are executed by at least one processor (also referred to as processing circuitry) 1403 of network node 542, at least one processor 1403 of network node 542 performs respective operations discussed herein. Processing circuitry 1403 of network node 542 may thus transmit and/or receive communications to/from one or more other network nodes/entities/servers of a telecommunications network through network interface 1407 of network node 542. In addition, processing circuitry 1403 of network node 542 may transmit and/or receive communications to/from one or more wireless devices through interface 1401 of network node 542.

These and other related operations will now be described in the context of the operational flowcharts of FIGS. 17-19 of operations that may be performed by a computer system (e.g., computer system 500) according to various embodiments of inventive concepts. Each of the operations described in FIGS. 17-19 can be combined and/or omitted in any combination with each other, and it is contemplated that all such combinations fall within the spirit and scope of this disclosure.

Figure 17:
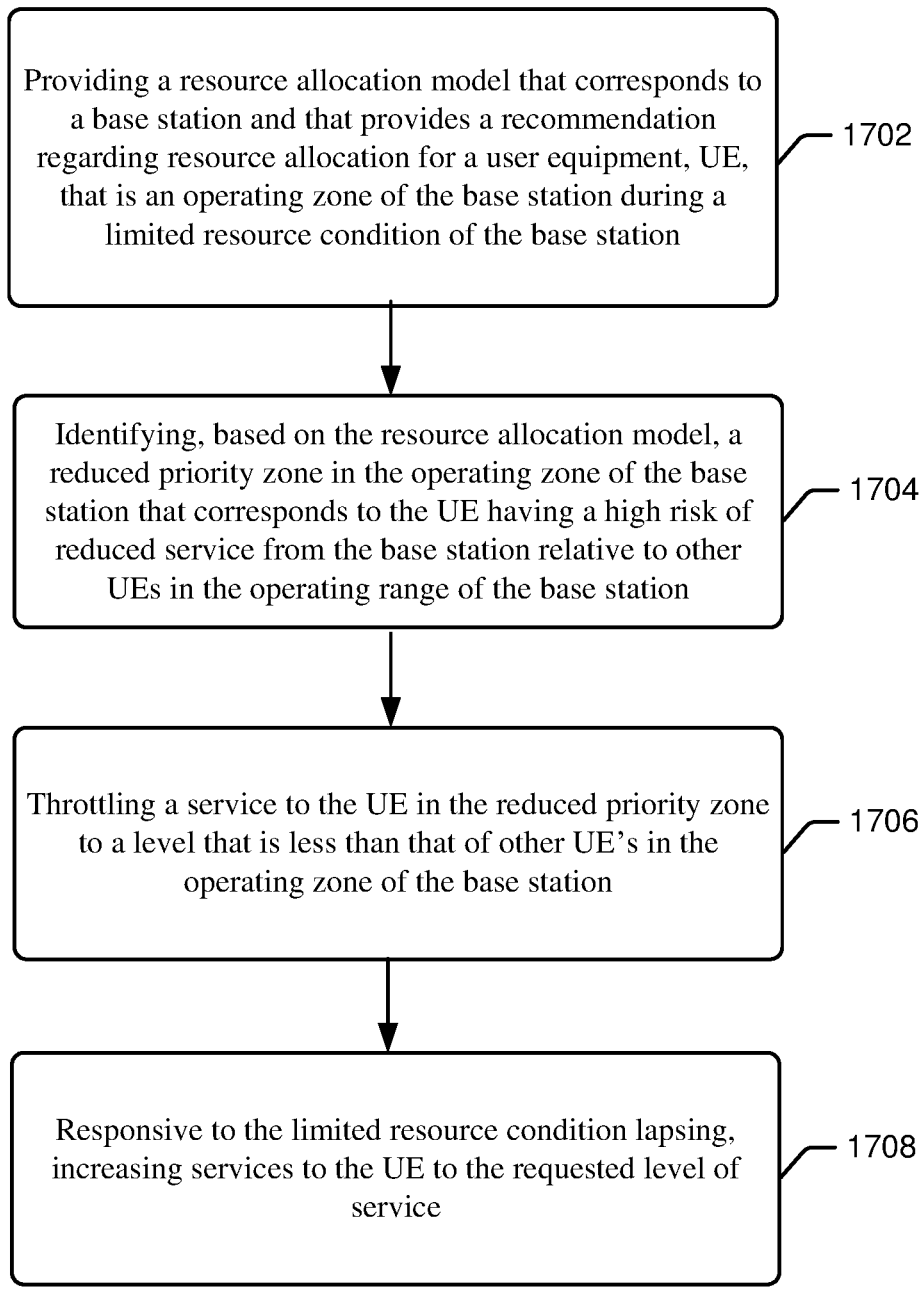
FIGS. 17-19 are flowcharts illustrating operations that may be performed in accordance with some embodiments of the present disclosure.

Referring now to FIG. 17, operations can be performed by a computer system (e.g., 500 implemented using the structure of the block diagram of FIG. 15) including a network node in a telecommunications network. Operations include providing a resource allocation model that corresponds to a base station and that provides a recommendation regarding resource allocation for a UE that is an operating zone of the base station during a limited resource condition of the base station (block 1702). Operations further include identifying, based on the resource allocation model, a reduced priority zone in the operating zone of the base station that corresponds to the UE having a high risk of reduced service from the base station relative to other UEs in the operating range of the base station (block 1704).

In some embodiments, methods further include throttling a service to the UE in the reduced priority zone to a level that is less than that of other UE's in the operating zone of the base station (block 1706). In some embodiments, in response to throttling the service to the UE in the reduced priority zone, operations include increasing a service level of at least one of the other UEs in the operating zone.

In some embodiments, the limited resource condition includes a cell traffic utilization of the base station that is greater than a cell traffic utilization threshold. For example, a cell traffic utilization threshold may be expressed as a percentage of the total cell traffic capacity, such as some value greater than about 50%. Such value is merely by example and does not limit the scope of the inventive concept to such value. In some embodiments, the reduced priority zone includes a zone that is inside and adjacent at least a portion of a border that defines the operating zone of the network node.

Some embodiments provide that the reduced priority zone is a dynamically determined priority zone that changes responsive to changing base station conditions. In some embodiments, a spread of the reduced priority zone may dynamically change as an angular portion of the reduced priority zone changes. Some embodiments provide that the reduced priority zone is determined based on a velocity of the UE in the operating zone of the base station. In some embodiments, the reduced priority zone is determined based on a direction of travel of the UE in the operating zone of the base station. In some embodiments, the reduced priority zone is within and non-adjacent the operating zone. For example, a portion of the operating zone may be between the reduced priority zone and the border that defines the operating zone.

Some embodiments provide that throttling the service to the UE includes providing a lower level of service than a service level that is requested by the UE. In some embodiments, in response to the limited resource condition lapsing, increasing services to the UE to the requested level of service (block 1708). In some embodiments, throttling the service includes selectively throttling the service to UE's with best effort traffic without throttling the service to UE's with low-latency requirements.

In some embodiments, the resource allocation model includes a machine learning intelligent agent that receives multiple input parameters corresponding to multiple UEs that are in the operating zone of the base station and generates outputs corresponding to each of the UE's that identifies whether ones of the UE's are in corresponding reduced priority zones. Some embodiments provide that the outputs of the machine learning intelligent agent include probability values that estimate the cumulative distribution function, CDF, threshold times the probability of the UE being in the reduced priority zone.

In some embodiments, the input parameters include multiple UE input parameters and multiple base station input parameters. Some embodiments provide the UE input parameters include one or more of a reference signal receive power, RSRP, of current and neighboring cells, a reference signal received quality, RSRQ, of current and neighboring cells, and a sampling rate of UE measurements. In some embodiments, the UE input parameters further include one or more of a DE_HeadingValue, a DE_Longitude, a DE_LongitudinalAccelerationValue, a DE_SpeedConfidence, a DE_SpeedValue, and a DE_VerticalAccelerationValue. In some embodiments, the base station input parameters comprise one or more of UE speed, UE direction, cell breathing properties, reflection and environmental variables, and a load of current and neighboring cells.

In some embodiments, throttling the service to UEs includes dynamically allocating a fractional frequency reuse layer. For example, different zones in the operating zones may be partitioned into spatial regions with different frequency reuse factors. In this manner, the network may allocate different bandwidths in neighboring reduced priority zones in which inner layers may have similar frequencies and/or frequency ranges.

Some embodiments provide that the resource allocation model is specific to the base station and is used to identify multiple reduced priority zones that correspond to multiple UE's.

In some embodiments, the network node includes a cloud-based machine learning execution environment computer system and/or a cloud-based computing system communicatively coupled to the telecommunications network. In some embodiments, the network node in the telecommunications network includes a computer system that is configured to perform operations described herein.

Some embodiments provide that the network node includes a core network node in the telecommunications network and the core network node is configured to perform operations described herein.

Figure 18:
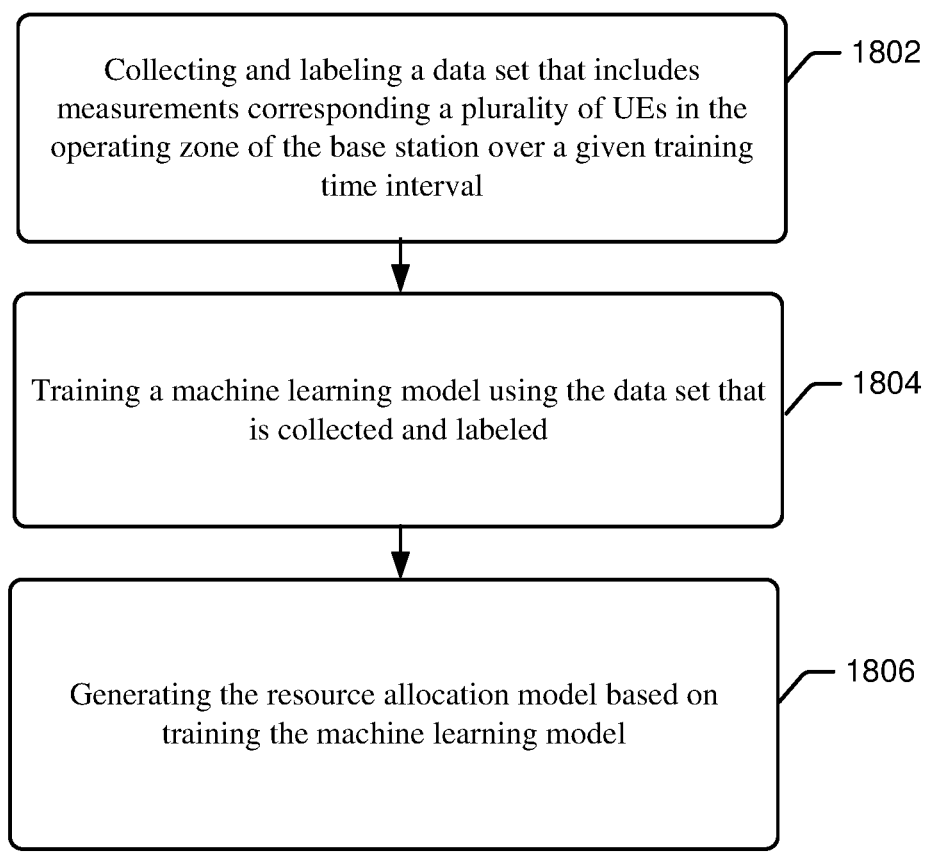

Referring to FIG. 18, further operations that can be performed by a computer system (e.g., 500 in FIG. 15) for providing the resource allocation model include collecting and labeling a data set that includes measurements corresponding to a plurality of UEs in the operating zone of the base station over a given training time interval (block 1802). Operations include training a machine learning model using the data set that is collected and labeled (block 1804) and generating the resource allocation model based on training the machine learning model (block 1806).

In some embodiments, labeling the data set includes indicating whether the UE corresponding to the data set is inside a reduced priority zone. Some embodiments provide that the machine learning model comprises at least one of an artificial neural network circuit, a random forest model circuit, an associative memory circuit, and a self-learning computing circuit.

In some embodiments, a training time interval value is based on a density of UEs in the operating zone and an area size of the operating zone and is specific to the base station. Some embodiments provide that the measurements are grouped into blocks that correspond to smaller durations than the training time interval value. In some embodiments, each of the blocks is labeled with a binary value based on whether the UE has a reduced connection during the block. In some embodiments, responsive to determining that a corresponding one of the blocks has a reduced connection, operations include labeling the block with a first binary value that corresponds to the reduced priority zone. Some embodiments provide that, responsive to determining that the corresponding one of the blocks does not have a reduced connection, operations include labeling the block with a second binary value that correspond to a zone other than the reduced priority zone.

Some embodiments provide that collecting and labeling the data set includes precollecting the data set that includes the measurements corresponding the UEs in the operating zone of the base station and automatically labeling blocks in the precollected data set using an iterative labeling operation. For example, data may be collected over a given period of time before any labeling operations occur. In some embodiments, the data may be collected at an actual base station over a given period of time. Once the full data set is collected (i.e., precollected), all of the collected measurements in the data set may then be labeled. Some embodiments provide that multiple sub-sets of data may be precollected in several batches of measurement data that can then be label one batch at a time.

In some embodiments, training the machine learning model includes at least one of performing offline training on the collected data set and performing online training responsive to receiving blocks of labeled data.

Some embodiments provide that providing the resource allocation model that corresponds to the base station includes providing an auto-regression model to determine reduced priority zones and to throttle service to the UE in the reduced priority zone. In some embodiments, the auto-regression model predicts a probability density function, PDF, of the reduced priority zones corresponding to each coordinate and uses a criticality threshold that is tunable to selectively prioritize UEs.

Figure 19:
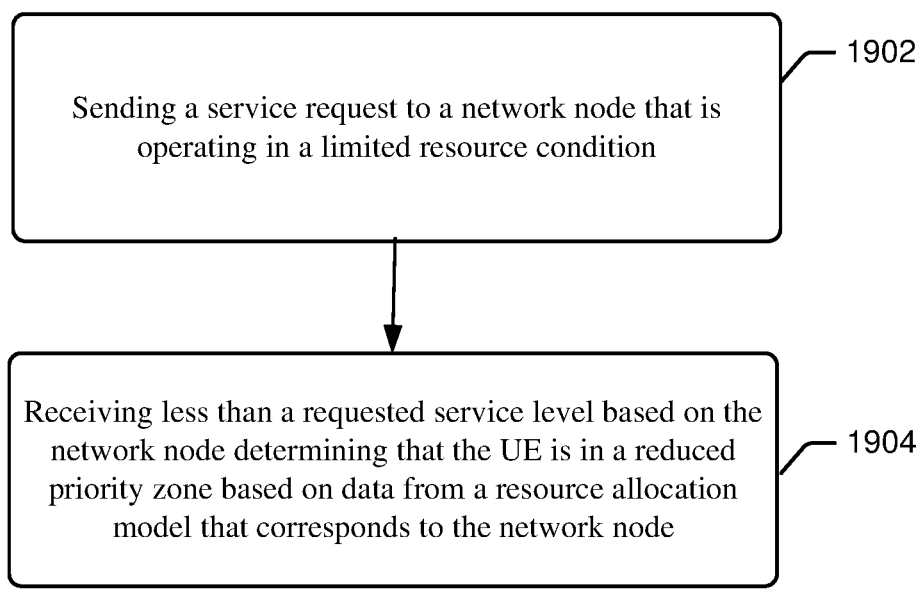

Reference is now made to FIG. 19, operations can be performed by a computer system (e.g., 500 implemented using the structure of the block diagram of FIG. 15) including a network node in a telecommunications network. Operations include sending a service request to a network node that is operating in a limited resource condition (block 1902) and receiving less than a requested service level based on the network node determining that the UE is in a reduced priority zone based on data from a resource allocation model that corresponds to the network node (1904). Other features corresponding to the reduced priority zone and the resource allocation model are discussed above and thus will not be repeated.

Figure 20:
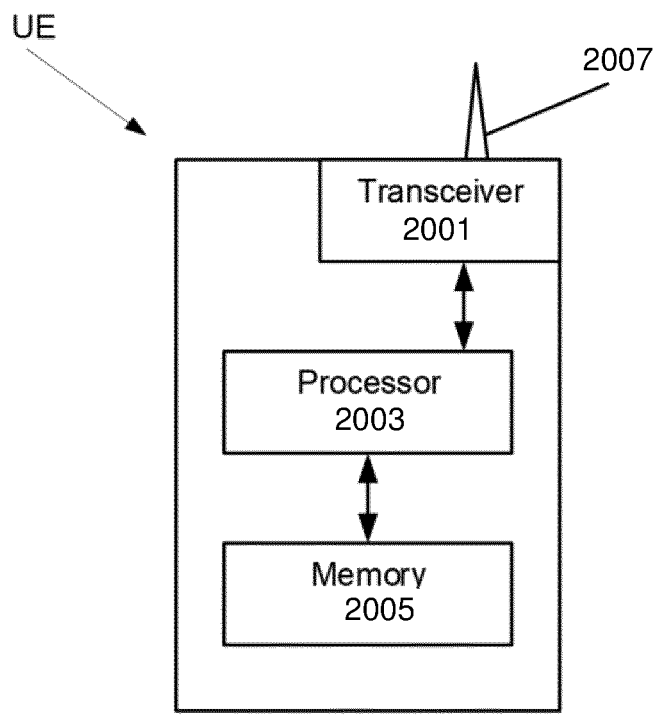
FIG. 20 is a block diagram illustrating a wireless device according to some embodiments of inventive concepts.

FIG. 20 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 2007, and a transceiver circuit 2001 (also referred to as a transceiver) including a transmitter and a receiver configured to provide uplink and downlink radio communications with a base station eNB of a wireless communication network (also referred to as a radio access network RAN). Wireless device UE may also include a processor circuit 2003 (also referred to as a processor) coupled to the transceiver circuit, and a memory circuit 2005 (also referred to as memory) coupled to the processor circuit. The memory circuit 2005 may include computer readable program code that when executed by the processor circuit 2003 causes the processor circuit to perform operations according to embodiments disclosed herein. According to other embodiments, processor circuit 2003 may be defined to include memory so that a separate memory circuit is not required. Wireless device UE may also include an interface (such as a user interface) coupled with processor 2003, and/or wireless device UE may be an IoT and/or MTC device.

As discussed herein, operations of wireless device UE may be performed by processor 2003 and/or transceiver 2001. For example, processor 2003 may control transceiver 2001 to transmit uplink communications through transceiver 2001 over a radio interface to a base station eNB of a wireless communication network and/or to receive downlink communications through transceiver 2001 from a base station eNB of the wireless communication network over a radio interface. Moreover, modules may be stored in memory 2005, and these modules may provide instructions so that when instructions of a module are executed by processor 2003, processor 2003 performs respective operations (e.g., operations discussed below with respect to Example Embodiments).

According to some embodiments, a computer program can be provided that includes instructions which, when executed on at least one processor, cause the at least one processor to carry out methods performed by the computer system.

According to some embodiments, a computer program product can be provided that includes a non-transitory computer readable medium storing instructions that, when executed on at least one processor, cause the at least one processor to carry out methods performed by the network node.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Claims are provided below. Reference numbers/letters are provided in parenthesis by way of example/illustration without limiting example embodiments to particular elements indicated by reference numbers/letters.

According to some embodiments, the methods disclosed in the claims below are all computer implemented methods, meaning that the methods may be executed by a processor of a computer or computer system. The methods provide the exemplary technical effect of increasing connection reliability for critical traffic UEs by enabling improved UE throttling.

The invention claimed is:

1. A method performed by a network node for a wireless telecommunications network, the method comprising:
   providing a resource allocation model that corresponds to a base station and that provides a recommendation regarding resource allocation for a user equipment (UE) that is in an operating zone of the base station during a limited resource condition of the base station; and
   identifying, based on the resource allocation model, a reduced priority zone in the operating zone of the base station that corresponds to the UE having a high risk of reduced service from the base station relative to other UEs in the operating range of the base station, wherein the reduced priority zone comprises a dynamically determined priority zone that changes responsive to changing base station conditions.

2. The method of claim 1, further comprising throttling a service to the UE in the reduced priority zone to a level that is less than that of other UE's in the operating zone of the base station, wherein the throttling is further based on a service priority of the UE in the reduced priority zone.

3. The method of claim 2, wherein, responsive to throttling the service to the UE in the reduced priority zone, increasing a service level of at least one of the other UEs in the operating zone.

4. The method of claim 1, wherein the limited resource condition comprises a cell traffic utilization of the base station that is greater than a cell traffic utilization threshold.

5. The method of claim 1, wherein the reduced priority zone comprises a zone that is inside and adjacent at least a portion of a border that defines the operating zone.

6. The method of claim 1, wherein a spread of the reduced priority zone may dynamically change as an angular portion of the reduced priority zone changes.

7. The method of claim 1, wherein the reduced priority zone is determined based on a velocity of the UE in the operating zone of the base station.

8. The method of claim 1, wherein the reduced priority zone is determined based on a direction of travel of the UE in the operating zone of the base station.

9. The method of claim 1, wherein the reduced priority zone is within and non-adjacent the operating zone, wherein a portion of the operating zone is between the reduced priority zone and the border that defines the operating zone.

10. The method of claim 1, wherein throttling the service to the UE comprises providing a lower level of service than a service level that is requested by the UE.

11. The method of claim 10, further comprising, responsive to the limited resource condition lapsing, increasing services to the UE to the requested level of service.

12. The method of claim 1, wherein throttling the service comprises selectively throttling the service to UE's with best effort traffic without throttling the service to UE's with low-latency requirements.

13. The method of claim 1, wherein the resource allocation model comprises a machine learning intelligent agent that receives a plurality of input parameters corresponding to a plurality of UEs that are in the operating zone of the base station and generates outputs corresponding to each of the plurality of UE's that identifies whether ones of the UE's are in corresponding reduced priority zones.

14. The method of claim 13, wherein the outputs of the machine learning intelligent agent comprise probability values that estimate the cumulative distribution function (CDF) threshold times the probability of the UE being in the reduced priority zone.

15. The method of claim 13, wherein the plurality of input parameters comprise a plurality of UE input parameters and a plurality of base station input parameters.

16. The method of claim 15, wherein the plurality of UE input parameters comprise at least one of: a reference signal receive power (RSRP) of current and neighboring cells, a reference signal received quality (RSRQ) of current and neighboring cells, and a sampling rate of UE measurements.

17. The method of claim 16, wherein the plurality of UE input parameters further comprises at least one of: a DE_Heading Value, a DE_Longitude, a DE_LongitudinalAcceleration Value, a DE_SpeedConfidence, a DE_SpeedValue, and a DE_VerticalAcceleration Value.

18. The method of claim 15, wherein the plurality of base station input parameters comprise at least one of: UE speed, UE direction, cell breathing properties, reflection and environmental variables, and a load of current and neighboring cells.

19. The method of claim 1, wherein throttling the service to a plurality of UEs comprises dynamically allocating a fractional frequency reuse layer.

\* \* \* \* \*